United States Patent [19]

Imai et al.

[11] Patent Number: 5,416,207

[45] Date of Patent: * May 16, 1995

[54] DICHLOROTIN PHTHALOCYANINE CRYSTAL, PROCESS FOR PRODUCING THE SAME, AND ELECTROPHOTOGRAPHIC PHOTORECEPTOR USING THE SAME

[75] Inventors: Akira Imai; Katsumi Nukada; Satsumi Daimon; Masakazu Iijima; Toru Ishii; Yasuo Sakaguchi; Kiyokazu Mashimo, all of Minami ashigara, Japan

[73] Assignee: Fuji Xerox Co., Ltd., Tokyo, Japan

[ * ] Notice: The portion of the term of this patent subsequent to Feb. 1, 2011 has been disclaimed.

[21] Appl. No.: 144,012

[22] Filed: Nov. 1, 1993

Related U.S. Application Data

[62] Division of Ser. No. 927,961, Aug. 11, 1992.

[30] Foreign Application Priority Data

Aug. 16, 1991 [JP] Japan .................................. 3-229690
Nov. 15, 1991 [JP] Japan .................................. 3-326721

[51] Int. Cl.$^6$ .............................................. C09B 67/12
[52] U.S. Cl. ..................................... 540/141; 540/140
[58] Field of Search ......................... 540/136, 141, 140

[56] References Cited

U.S. PATENT DOCUMENTS

| | | | |
|---|---|---|---|
| 2,770,629 | 11/1956 | Eastes ................ | 260/314.5 |
| 3,160,635 | 12/1964 | Knudson et al. ....... | 260/314.5 |
| 3,357,989 | 12/1967 | Byrne et al. .......... | 260/314.5 |
| 3,708,292 | 1/1973 | Brach et al. .......... | 96/1.5 |
| 4,981,767 | 1/1991 | Tokura et al. ........ | 430/58 |
| 5,059,503 | 10/1991 | Muto et al. ........... | 430/83 |
| 5,106,536 | 4/1992 | Miyamoto et al. ..... | 540/141 |
| 5,283,145 | 2/1994 | Nukada et al. ........ | 540/141 |
| 5,308,728 | 5/1994 | Imai et al. ............ | 540/141 |

FOREIGN PATENT DOCUMENTS

| | | |
|---|---|---|
| 48-34189 | 5/1973 | Japan . |
| 49-105536 | 10/1974 | Japan . |
| 50-38543 | 4/1975 | Japan . |
| 57-148745 | 9/1982 | Japan . |
| 58-21410 | 2/1983 | Japan . |
| 59-155847 | 9/1984 | Japan . |
| 61-151059 | 7/1986 | Japan . |
| 62-119547 | 5/1987 | Japan . |
| 64-14405 | 1/1989 | Japan . |
| 64-80965 | 3/1989 | Japan . |
| 1-144057 | 6/1989 | Japan . |
| 1-257967 | 10/1989 | Japan . |
| 2-175763 | 7/1990 | Japan . |
| 2-178358 | 7/1990 | Japan . |
| 3-61952 | 3/1991 | Japan . |
| 3-17453 | 7/1991 | Japan . |
| 3-174542 | 7/1991 | Japan . |
| 4-93366 | 3/1992 | Japan . |

OTHER PUBLICATIONS

*Zeitschrift fur Anorganische und allegemeine Chemie*, Band 354, Heft 1-2, S.1-112 Starke et al. pp. 1-9, Sep. 1967.

*Primary Examiner*—Mukund J. Shah
*Assistant Examiner*—Pavanaram K. Sripada
*Attorney, Agent, or Firm*—Oliff & Berridge

[57] ABSTRACT

A dichlorotin phthalocyanine crystal showing, in the X-ray diffractometry using a CuK$_\alpha$ ray, a peak at a Bragg angle (2θ±0.2°) of 28.2° with any other peak(s) observed at a Bragg angle(s) between 25° and 30° having an intensity of not more than 30% of that of the peak at 28.2°. The crystal is useful as a photoconductive material having sensitivity in the longer wavelength region. The electrophotographic photoreceptor containing the crystal exhibits high sensitivity and excellent durability.

13 Claims, 9 Drawing Sheets

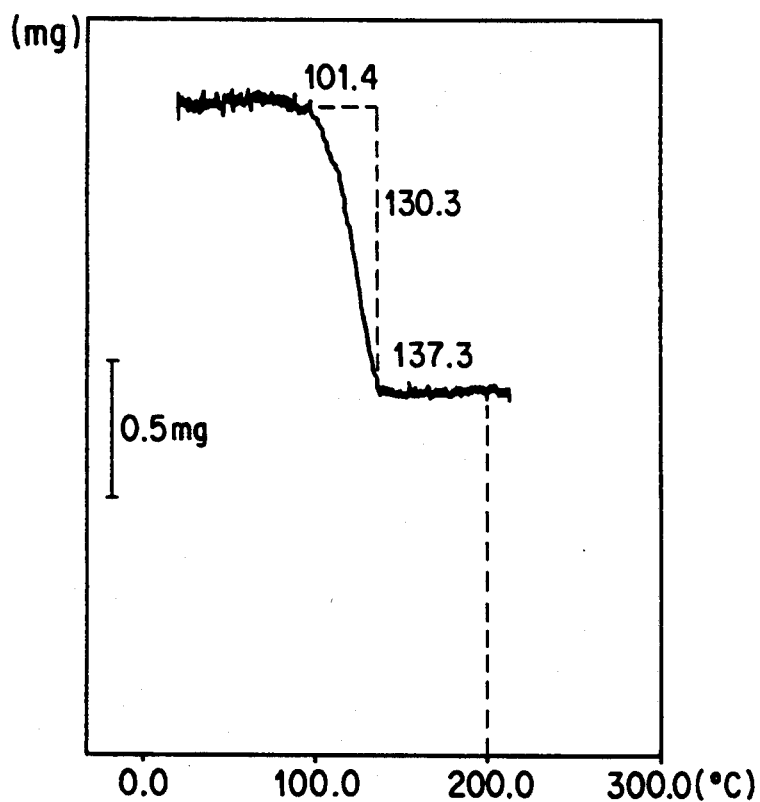
F I G. 15
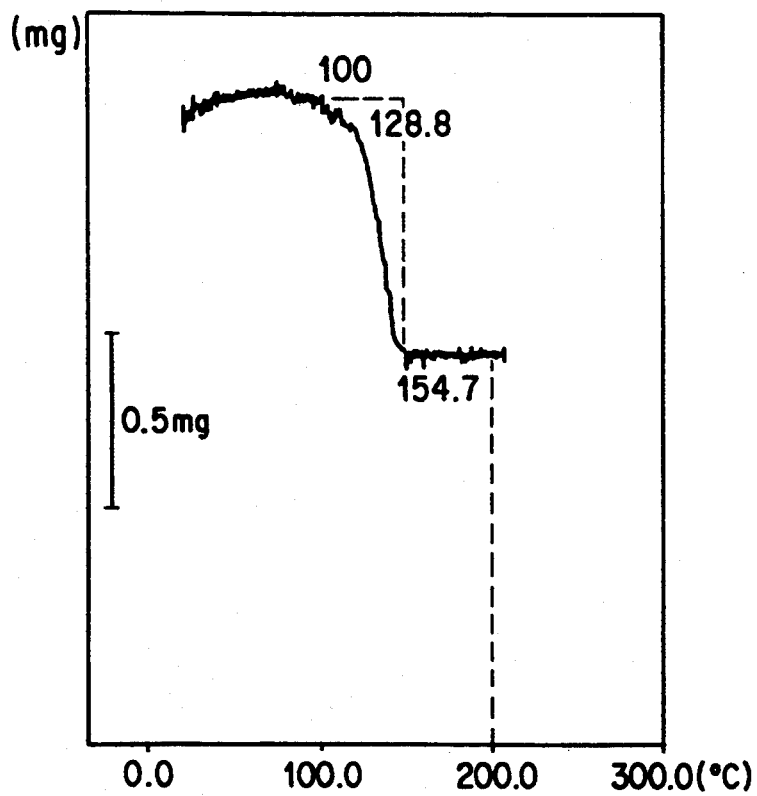
F I G. 16

DICHLOROTIN PHTHALOCYANINE CRYSTAL, PROCESS FOR PRODUCING THE SAME, AND ELECTROPHOTOGRAPHIC PHOTORECEPTOR USING THE SAME

This is a division of application Ser. No. 07/927,961 filed Aug. 11, 1992.

FIELD OF THE INVENTION

This invention relates to a novel crystal of dichlorotin phthalocyanine useful as a photoconductive material, a process for preparing the same, and an electrophotographic photoreceptor using the same.

BACKGROUND OF THE INVENTION

Phthalocyanine compounds are useful as coatings, printing inks, catalysts or electronic materials. In recent years, they have been extensively studied particularly for their use as electrophotographic photoreceptor materials, optical recording materials and photoelectric conversion materials.

In the field of electrophotographic photoreceptors, there has recently been an increasing demand to extend the photosensitive wavelength region of conventional organic photoconductive materials to a longer side of near infrared light (780 to 830 nm) which corresponds to a wavelength region of a semi-conductor laser so as to make them applicable to a digital recording system, such as a laser printer. From this point of view, there have been reported photoconductive materials for semiconductor lasers, such as squarylium compounds as disclosed in JP-A-49-105536 and JP-A-58-21410, triphenylamine type tris-azo compounds as disclosed in JP-A-61-151059, and phthalocyanine compounds as disclosed in JP-A-48-34189 and JP-A-57-148745 (the term "JP-A" as used herein means an "unexamined published Japanese patent application").

In cases where an organic photoconductive material is used as a photosensitive material for semi-conductor lasers, they are required to have a photosensitive wavelength region extended to a longer side and to provide a photoreceptor having satisfactory sensitivity, and durability. None of the above-described conventional organic photoconductive materials sufficiently satisfies these requirements.

In order to overcome the drawbacks of the conventional organic photoconductive materials, the relationship between their crystal form and electrophotographic characteristics has been studied. In particular, many reports have been made on phthalocyanine compounds.

It is known that phthalocyanine compounds generally exhibit several different crystal forms depending on the process of production or the process of treatment and that the difference in crystal form has a great influence on their photoelectric conversion characteristics. For example, known crystal forms of copper phthalocyanine compounds include $\alpha$-, $\pi$-, $\chi$-, $\rho$-, $\gamma$-, and $\delta$-forms as well as a stable $\beta$-form. These crystal forms are known capable of interconversion by a mechanical strain, a sulfuric acid treatment, an organic solvent treatment, a heat treatment, and the like as described, e.g., in U.S. Pat. Nos. 2,770,629, 3,160,635, 3,708,292, and 3,357,989. Further, JP-A-50-38543 refers to the relation between a crystal form of copper phthalocyanine and electrophotographic characteristics.

JP-A-62-119547 discloses an electrophotographic photoreceptor using a dihalogenotin phthalocyanine compound as a charge generating material. JP-A-1-14405 discloses a tin phthalocyanine compound having specific peaks on its X-ray diffraction pattern and an electrophotographic photoreceptor using the same. JP-A-62-119547 discloses a tin phthalocyanine compound having X-ray diffraction peaks at Bragg angles of 8.4°, 12.2°, 13.8°, 26.5° and 28.2°, wherein the peakes at 26.5° and 28.2° have substantially equal intensity.

However, any of the known phthalocyanine compounds proposed to date is still unsatisfactory in photosensitivity and durability when used as a photosensitive material.

SUMMARY OF THE INVENTION

An object of the present invention is to provide a new crystal of dichlorotin phthalocyanine which has photosensitivity in the longer wavelength region and is useful as a photoconductive material and to provide a process for preparing the same.

Another object of the present invention is to provide an electrophotographic photoreceptor having high photosensitivity and excellent durability.

As a result of extensive investigations, the inventors have found that a novel dichlorotin phthalocyanine crystal exhibiting high sensitivity and durability as a photoconductive material can be obtained by subjecting a synthetically obtained dichlorotin phthalocyanine crystal to a specific treatment, and thus reached the present invention.

The present invention relates to a dichlorotin phthalocyanine crystal showing, in the X-ray diffractometry using a CuK$_\alpha$ ray, a peak at a Bragg angle ($2\theta \pm 0.2°$) of 28.2° with any other peak(s) observed at a Bragg angle(s) between 25° and 30° having an intensity of not more than 30% of that of the peak at 28.2°, and more particularly to a dichlorotin phthalocyanine crystal showing, in the X-ray diffractometry using a CuK$_\alpha$ ray, clear peaks at Bragg angles ($2\theta \pm 0.2°$) of 8.3°, 12.2°, 13.7°, and 28.2°.

The present invention also relates to an electrophotographic photoreceptor comprising a conductive substrate having thereon at least a photosensitive layer containing the above-described dichlorotin phthalocyanine crystal.

BRIEF DESCRIPTION OF THE DRAWING

FIGS. 15 through 17 are each a thermogram of the dichlorotin phthalocyanine crystal of III-form obtained in Synthesis Example 2, the dichlorotin phthalocyanine crystal of IV-form obtained in Synthesis Example 3, and the dichlorotin phthalocyanine crystal of I-form obtained in Example 4.

DETAILED DESCRIPTION OF THE INVENTION

Figure 1:
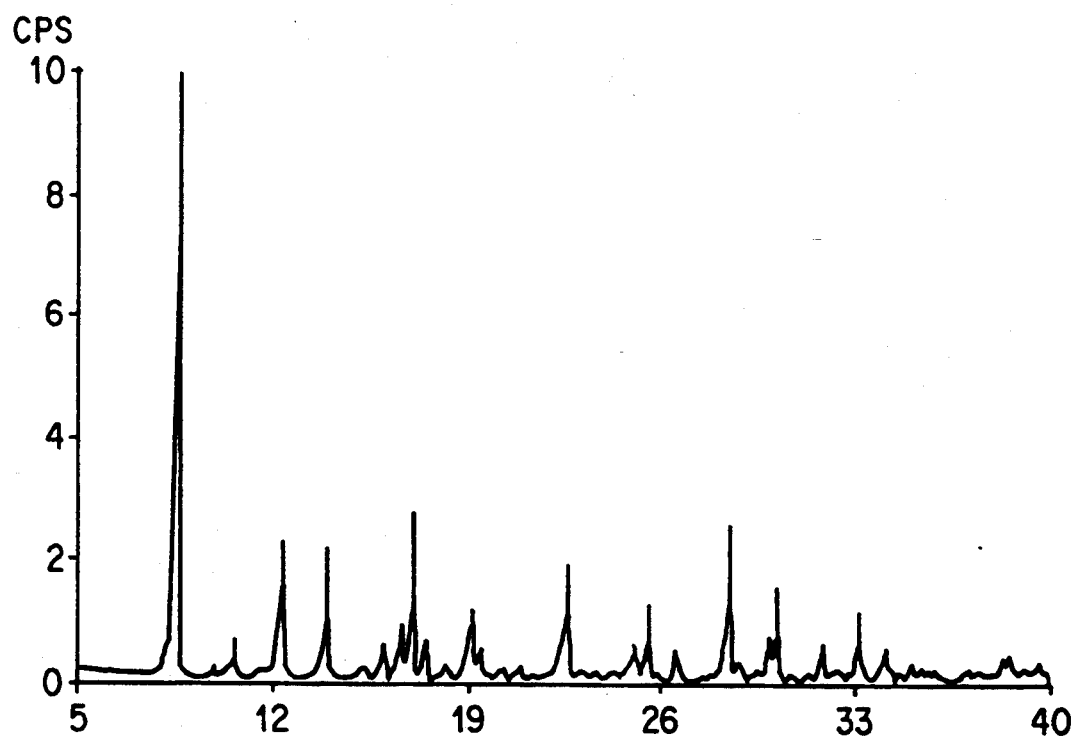
FIG. 1 is a powder X-ray diffraction pattern of the dichlorotin phthalocyanine crystal obtained in Synthesis Example 1.

The novel dichlorotin phthalocyanine crystal according to the present invention can be prepared by grinding dichlorotin phthalocyanine crystals synthesized by a known process either with a mechanical force or in a specific organic solvent. For the sake of convenience for understanding, the grinding with a mechanical force will hereinafter be referred simply to grinding, while the grinding in an organic solvent will be referred to as milling.

Apparatus to be used for grinding include, while not limiting, a mortar, a ball mill, an attritor, and a sand mill. If desired, a grinding medium, such as glass beads and steel beads, or a grinding aid, such as sodium chloride and Glauber's salt, may be used in grinding.

The time required for grinding depends on the kind and capacity of the apparatus used. In practice, it is desirably decided while confirming the X-ray diffraction pattern of a sample of grinds. For instance, in case of using the ball mill described in Example 1 hereinafter given, grinding is preferably conducted for a period of from 30 minutes to 4 hours. Grinding for an excessively long time sometimes results in formation of different crystal forms.

Solvents which can be used for milling include ketones, such as acetone, methyl ethyl ketone (MEK), and cyclohexanone; esters, such as ethyl acetate and n-butyl acetate; ethers; amides, such as N,N-dimethylformamide (DMF) and N-methylpyrrolidone; and halogenated hydrocarbons, such as methylene chloride, chloroform, and 1,1,2-trichloroethane. These solvents may be used either individually or in combinations of two or more thereof.

Apparatus to be used for milling include, while not limiting, a ball mill, a sand mill, and a kneader. If desired, a grinding medium, such as glass beads and steel beads, or a grinding aid, such as sodium chloride and Glauber's salt, may be used.

Milling with an organic solvent is carried out at a temperature of from 10° to 50° C., and usually at room temperature, for a period of from 10 to 100 hours.

According to the inventors' study, dichlorotin phthalocyanine takes four crystal forms, I-, II-, III-, and IV-forms. These crystal forms can be obtained by grinding or milling a synthetically prepared dichlorotin phthalocyanine. Of the four crystal forms, III and IV crystal forms are less stable than I and II crystal forms and ready to be transformed into a I crystal form by treating with an appropriate organic solvent. Although the powder X-ray diffraction pattern of the I crystal form available through III or IV crystal form is in good agreement with that of a I crystal form obtained without having passed through a III or IV crystal form in terms of peak position but quite different in peak intensity. In particular, the former proved superior to the latter in electrophotographic characteristics, and therefore, the former is preferred.

Accordingly, among the dichlorotin phthalocyanine crystals of the present invention, preferred are those belonging to a I crystal form and having an X-ray diffraction pattern against a CuK$_\alpha$ ray ($\lambda$=1.5418 A.U.) in which the highest of the peaks appearing within a Bragg angle (2$\theta$+0.2°) range between 25° and 30° is at 28.2°, and preferably any other peak(s) observed at a Bragg angle(s) between 25° and 30° has an intensity of not more than 30% of that of the peak at 28.2°. The preferred crystals can be obtained by treating in an organic solvent a dichlorotin phthalocyanine crystal belonging to a III crystal form and having intense diffraction peaks at Bragg angles (2$\theta$±0.2°) of 8.7°, 9.9°, 10.9°, 13.1°, 15.2°, 16.3°, 17.4°, 21.9°, and 25.5° (hereinafter referred to as crystal (1)) or a dichlorotin phthalocyanine crystal belonging to a IV crystal form and having intense diffraction peaks at Bragg angles (2$\theta$+0.2°) of 9.2°, 12.2°, 13.4°, 14.6°, 17.0°, and 25.3° (hereinafter referred to as crystal (2)).

The starting dichlorotin phthalocyanine crystals (1) and (2) are both novel crystals and can be prepared by milling dichlorotin phthalocyanine crystals prepared by a known process in a specific organic solvent by means of a ball mill, etc., or dry grinding the synthetically prepared dichlorotin phthalocyanine crystals and treating the grinds with the specific organic solvent.

The organic solvents to be used for the preparation of crystal (1) (III crystal form) include aromatic hydrocarbons, e.g., toluene, xylene, and chlorobenzene, with chlorobenzene being preferred. Those to be used for the preparation of crystal (2) (IV crystal form) include ethers, e.g., tetrahydrofuran (THF) and 1,4-dioxane, with THF being preferred.

The thus obtained crystals (1) or (2) is then treated in an organic solvent to be transformed to a dichlorotin phthalocyanine crystal of I form showing, in its X-ray diffraction pattern, the highest of the diffraction peaks appearing within a Bragg angle (2$\theta$+0.2°) range between 25° and 30° at 28.2°.

The organic solvents to be used for crystal transformation from III or IV to I include ketones, such as acetone and MEK; halogenated hydrocarbons, such as methylene chloride and chloroform; acetic esters, such as ethyl acetate and butyl acetate; DMF, pyridine, and so on. The solvent to be used is selected appropriately from among these various kinds so that the resulting dichlorotin phthalocyanine crystal may have the highest of the X-ray diffraction patterns observed between 25° and 30° of Bragg angle at 28.2°. Particularly preferred of the above solvents are acetic esters.

The crystal transformation is effected by dispersing crystals (1) or (2) in the organic solvent at room temperature to 100° C. with or without a grinding medium such as glass beads and steel beads, or a grinding aid such as sodium chloride and Glauber's salt. In the case where the grinding medium is added to the system, the amount of the grinding medium is not limited but preferably not less than the weight of the solid content in the dispersion. The processing temperature is preferably from 10° to 50° C., and the processing time is generally from 10 minutes to 100 hours, preferably from 1 to 50 hours.

For enjoying industrial advantages, the organic solvent to be used for crystal transformation may contain a binder resin. In this case, crystal transformation can be effected while dispersing the system, and the dispersion as obtained can be directly used as a coating composition for formation of a charge generating layer.

As previously described, the thus obtained crystals of I form are especially superior in electrophotographic characteristics to crystals of I form which are obtained without passing through a III or IV crystal form. The powder X-ray diffraction pattern of the former is in good agreement with that of the latter in terms of peak position but quite different in peak intensity. This appears to be because transformation from III or IV into I is accompanied by removal of volatile components having been incorporated into the III or IV crystal form, causing a strain on the crystal lattice. As a result, the crystal growth axis becomes different to exert influences on crystal orientation.

Electrophotographic photoreceptors according to the present invention in which the above-described dichlorotin phthalocyanine crystal is used as a photoconductive material in the photosensitive layer thereof are explained below.

A photosensitive layer may have a so-called separate function type laminate structure composed of a charge generating layer and a charge transporting layer or a single layer structure.

Where a photosensitive layer has a laminate structure, the charge generating layer comprises the above-mentioned dichlorotin phthalocyanine crystal and a binder resin. Binder resins to be used can be chosen from a wide variety of insulating resins or organic photoconductive polymers, e.g., poly-N-vinylcarbazole, polyvinylanthracene, and polyvinylpyrene. Suitable binder resins include insulating resins, such as polyvinyl butyral, polyarylate (e.g., a polycondensate of bisphenol A and phthalic acid), polycarbonate, polyester, phenoxy resins, vinyl chloride-vinyl acetate copolymers, polyvinyl acetate, acrylic resins, polyacrylamide, polyamide, polyvinylpyridine, cellulose resins, urethane resins, epoxy resins, casein, polyvinyl alcohol, and polyvinyl pyrrolidone.

The charge generating layer can be formed by coating a conductive substrate with a coating composition prepared by dispersing the dichlorotin phthalocyanine crystal in a solution of a binder resin in an appropriate organic solvent, followed by drying. A suitable weight ratio of the dichlorotin phthalocyanine crystal to the binder resin is from 40:1 to 1:10, and preferably from 10:1 to 1:4. If the ratio of the dichlorotin phthalocyanine crystal is too high, the coating composition has reduced stability. If it is too low, the resulting photoreceptor has reduced sensitivity. It is also possible that a coating composition is prepared by using a dichlorotin phthalocyanine crystal of III or IV-form and then converting the crystal form to an I-form while in the composition.

Solvents to be used in the coating composition are preferably selected from those incapable of dissolving a lower layer, e.g., a subbing layer or a charge transporting layer. Examples of suitable solvents are alcohols, e.g., methanol, ethanol, and isopropanol; ketones, e.g., acetone, MEK, and cyclohexanone; amides, e.g., DMF and N,N-dimethylacetamide; dimethyl sulfoxide; ethers, e.g., THF, dioxane, and ethylene glycol monomethyl ether; esters, e.g., methyl acetate and ethyl acetate; aliphatic halogenated hydrocarbons, e.g., chloroform, methylene chloride, dichloroethylene, and trichloroethylene; and aromatic hydrocarbons, e.g., benzene, toluene, xylene, ligroin, monochlorobenzene, and dichlorobenzene. Among them, acetic esters are preferred.

Coating can be carried out by any of known techniques, such as dip coating, spray coating, spinner coating, bead coating, wire bar coating, blade coating, roller coating, and curtain coating. Drying is preferably conducted first at room temperature to once obtain a dry-to-touch state and then under heating at a temperature of from 30° to 200° C. for 5 minutes to 2 hours in still air or in an air flow.

The charge generating layer usually has a dry thickness of from about 0.05 to about 5 μm.

The charge transporting layer consists of a charge transporting material and a binder resin. Any of known charge transporting materials can be utilized, including polycyclic aromatic compounds, e.g., anthracene, pyrene, and phenanthrene; nitrogen-containing heterocyclic compounds, e.g., indole, carbazole, and imidazole; pyrazoline compounds, hydrazone compounds, triphenylmethane compounds, triphenylamine compounds, enamine compounds, and stilbene compounds.

Further included in usable charge transporting materials are photoconductive polymers, such as poly-N-vinylcarbazole, halogenated poly-N-vinylcarbazole, polyvinyl anthracene, poly-N-vinylphenyl anthracene, polyvinyl pyrene, polyvinyl acridine, polyvinyl acenaphthylene, polyglycidyl carbazole, pyrene-formaldehyde resins, and ethylcarbazole-formaldehyde resins. These polymers may form a charge transporting layer by themselves.

Binder resins which can be used in the charge transporting layer can be selected from those described above with reference to a charge generating layer.

The charge transporting layer can be formed by coating a conductive substrate or a charge generating layer with a coating composition comprising the above-described charge transporting material, a binder resin, and an organic solvent incapable of dissolving a lower layer in the same manner as for the charge generating layer. A suitable weight ratio of the charge transporting material to the binder resin is from 5:1 to 1:5.

The charge transporting layer has a dry thickness usually of from about 5 to about 50 μm, and preferably of from 10 to 30 μm.

Where a photoreceptors has a single layer structure, the photosensitive layer is comprised of a photoconductive layer in which the above-described dichlorotin phthalocyanine crystal is dispersed in a binder resin together with a charge transporting material. It is preferable that the weight ratio of the charge transporting material to the binder resin ranges from about 1:20 to about 5:1, and the weight ratio of the dichlorotin phthalocyanine crystal to the charge transporting material ranges from about 1:10 to about 10:1. The charge transporting material and binder resin which can be used are selected from those enumerated above.

Any conductive substrate known useful in electrophotographic photoreceptors can be used in the present invention.

If desired, a subbing layer may be provided on the conductive substrate. A subbing layer is effective for blocking unnecessary charges which may be introduced from the conductive substrate thereby to improve charging properties of a photosensitive layer. It also serves to improve adhesion between a conductive substrate and a photosensitive layer.

Materials for constituting the subbing layer include polyvinyl alcohol, polyvinyl pyrrolidone, polyvinylpyridine, cellulose ethers, cellulose esters, polyamide, polyurethane, casein, gelatin, polyglutamic acid, starch, starch acetate, amino starch, polyacrylic acid, polyacrylamide, zirconium chelate compounds, zirconium alkoxide compounds, organozirconium compounds, titanium chelate compounds, titanium alkoxide compounds, organotitanium compounds, and silane coupling agents. The subbing layer usually has a thickness of from about 0.05 to about 2 μm.

The present invention is now illustrated in greater detail with reference to Examples, but it should be understood that the present invention is not deemed to be limited thereto. All the parts and percents are by weight unless otherwise indicated.

SYNTHESIS EXAMPLE 1

Synthesis of Dichlorotin Phthalocyanine

To 350 ml of 1-chloronaphthalene were added 50 g of phthalonitrile and 27 g of anhydrous stannic chloride, and the mixture was allowed to react at 195° C. for 5 hours. The reaction product was collected by filtration and washed successively with 1-chloronaphthalene, acetone, methanol, and water to obtain 18.3 g (yield 27%) of a dichlorotin phthalocyanine crystal.

A powder X-ray diffraction pattern (hereinafter abbreviated as XRD) of the resulting dichlorotin phthalocyanine crystal is shown in FIG. 1.

SYNTHESIS EXAMPLE 2

Figure 2:
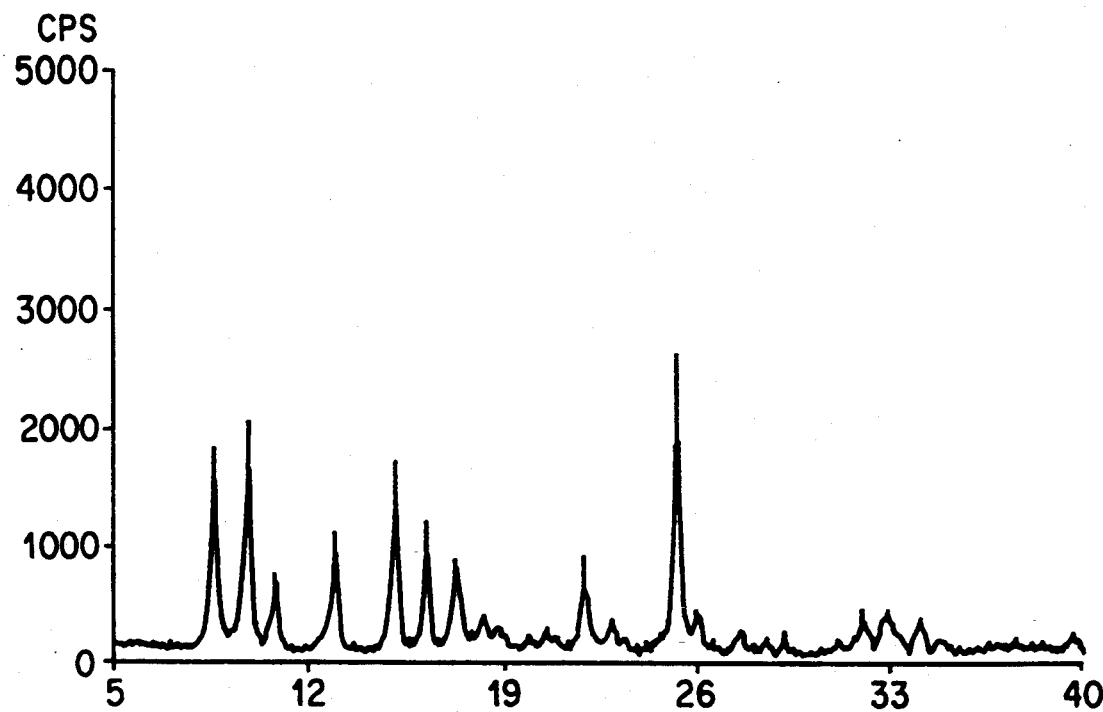
FIG. 2 is a powder X-ray diffraction pattern of the dichlorotin phthalocyanine crystal having a III-form obtained in Synthesis Example 2.

One gram of the dichlorotin phthalocyanine crystal obtained in Synthesis Example 1 were milled in 30 ml of monochlorobenzene (hereinafter abbreviated as MCB) together with 100 g of glass beads (diameter: 1 mm) by means of a ball mill at room temperature for 72 hours. The resulting slurry was filtered, and the filter cake was washed repeatedly with methanol and dried under reduced pressure to obtain 0.97 g of a dichlorotin phthalocyanine crystal of III-form. An XRD and a thermogram of the resulting dichlorotin phthalocyanine crystal are shown in FIGS. 2 and 15, respectively. The thermogram reveals a weight loss of about 11% at about 130° C. (a sample weighing 9.39 mg was analyzed).

SYNTHESIS EXAMPLE 3

Figure 3:
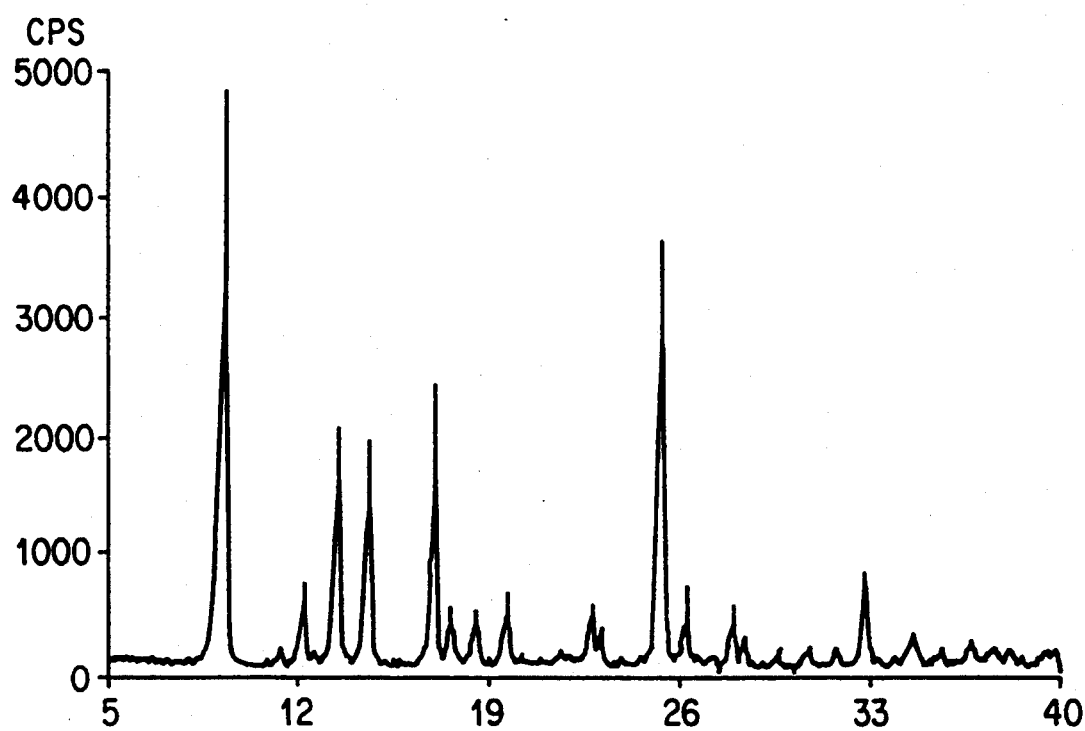
FIG. 3 is a powder X-ray diffraction pattern of the dichlorotin phthalocyanine crystal of IV-form obtained in Synthesis Example 3.

The same procedure as in Synthesis Example 2 was repeated, with the exception that MCB used as a solvent was replaced with THF. There was obtained 0.93 g of a dichlorotin phthalocyanine crystal of IV-form. An XRD and a thermogram of the resulting dichlorotin phthalocyanine crystal are shown in FIGS. 3 and 16, respectively. The thermogram reveals a weight loss of about 7% at about 150° C. (a sample weighing 9.79 mg was analyzed).

EXAMPLE 1

Figure 4:
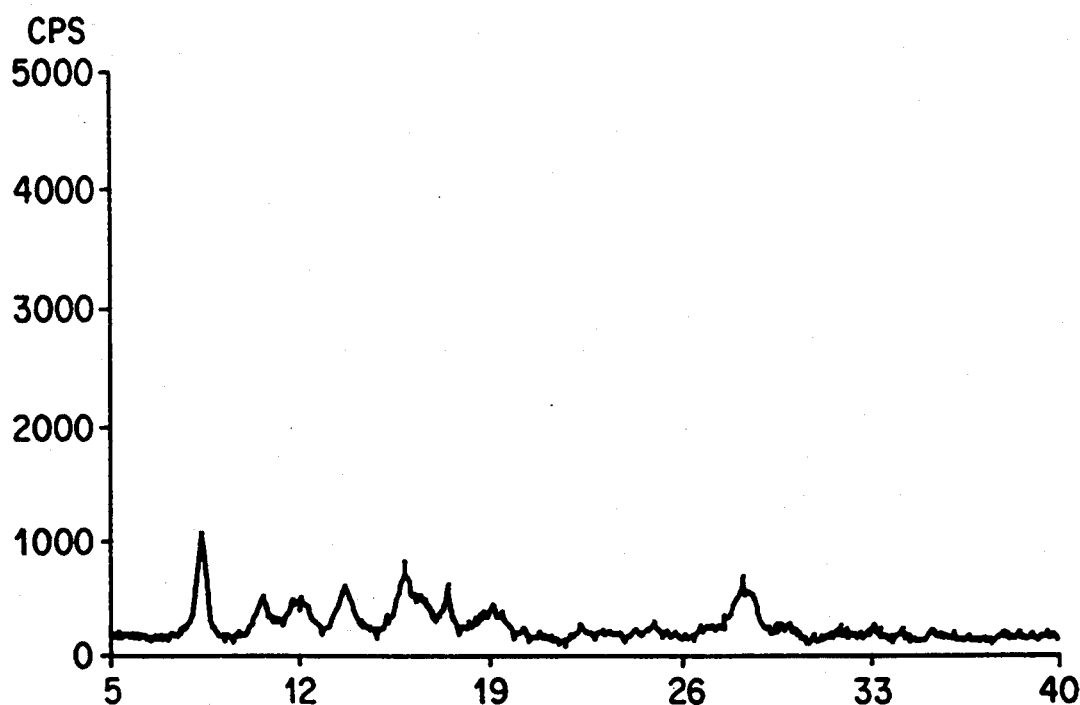
FIG. 4 is a powder X-ray diffraction pattern of the dichlorotin phthalocyanine crystal obtained in Example 1.

Five grams of the dichlorotin phthalocyanine crystal obtained in Synthesis Example 1 was put in a 500 ml-volume agate-made pot together with 500 g of agate balls (diameter: 20 mm) and ground by using a planetary ball mill ("P-5" manufactured by Fritsch Co.) at 400 rpm for 1 hour. An XRD of the resulting dichlorotin phthalocyanine crystal is shown in FIG. 4.

SYNTHESIS EXAMPLE 4

A 0.5 g portion of the dichlorotin phthalocyanine crystal obtained in Example 1 was milled with 15 ml of MCB and 30 g of glass beads at room temperature for 24 hours. The glass beads were separated by filtration, and the filtrate was dried to obtain 0.45 g of a dichlorotin phthalocyanine crystal of III-form. The XRD of the resulting crystal was the same as FIG. 2.

SYNTHESIS EXAMPLE 5

The same procedure of Synthesis Example 4 was repeated, except for replacing MCB with THF. There was obtained 0.43 g of a dichlorotin phthalocyanine crystal of IV-form. The XRD of the crystal was the same as FIG. 3.

EXAMPLE 2

Figure 5:
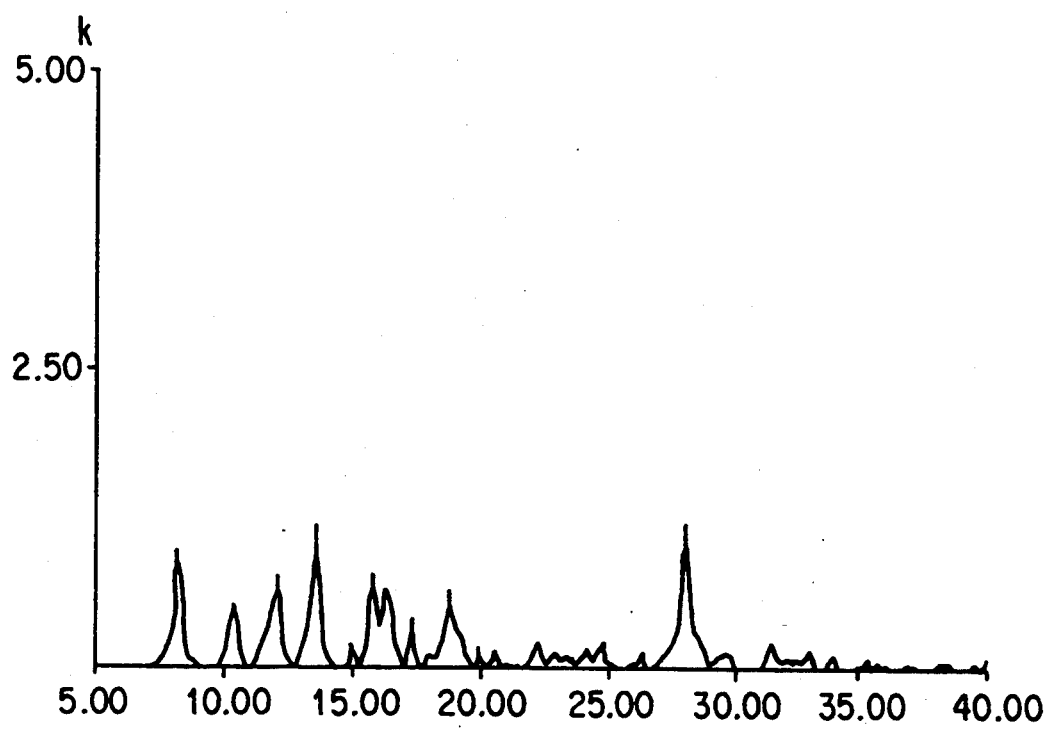
FIGS. 5 and 6 are each a powder X-ray diffraction pattern of the dichlorotin phthalocyanine crystal obtained in Examples 2 and 3, respectively.

One gram of the dichlorotin phthalocyanine crystal obtained in Synthesis Example 1 was milled with 30 ml of methylene chloride and 100 g of glass beads (diameter: 1 mm) in a ball mill at room temperature for 24 hours, followed by filtration. The solid was washed repeatedly with methanol and dried under reduced pressure to obtain 0.95 g of a dichlorotin phthalocyanine crystal. An XRD of the resulting crystal is shown in FIG. 5.

EXAMPLE 3

Figure 6:
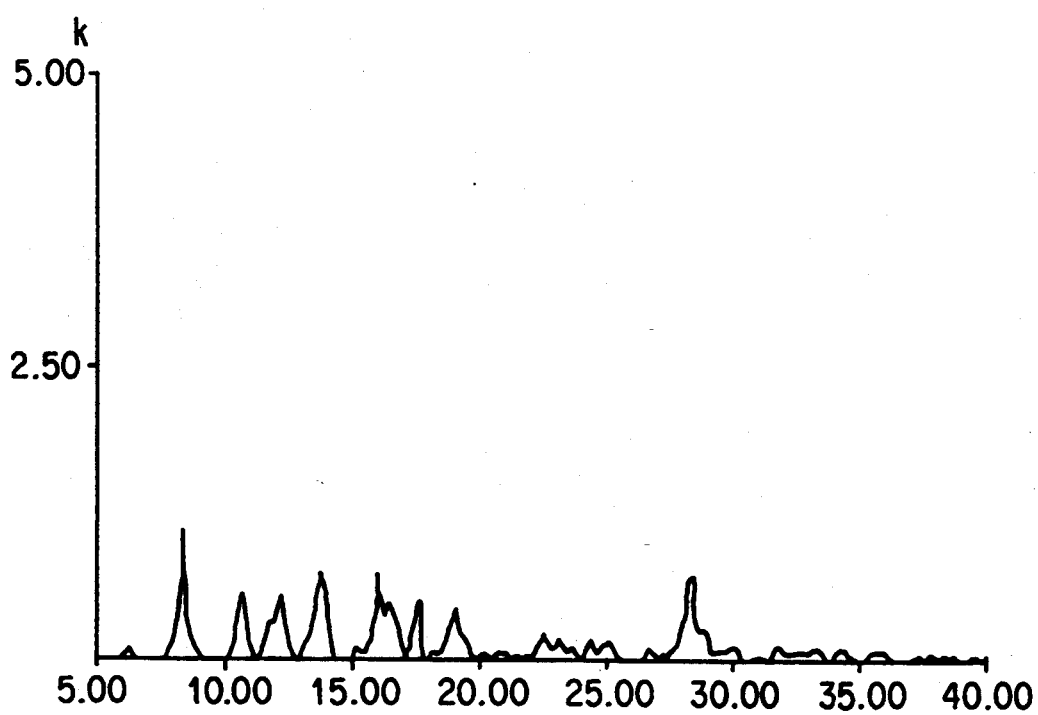

The same procedure of Example 2 was repeated, except for replacing methylene chloride with MEK. There was obtained 0.86 g of a dichlorotin phthalocyanine crystal. An XRD of the resulting dichlorotin phthalocyanine crystal is shown in FIG. 6.

EXAMPLE 4

Figure 7:
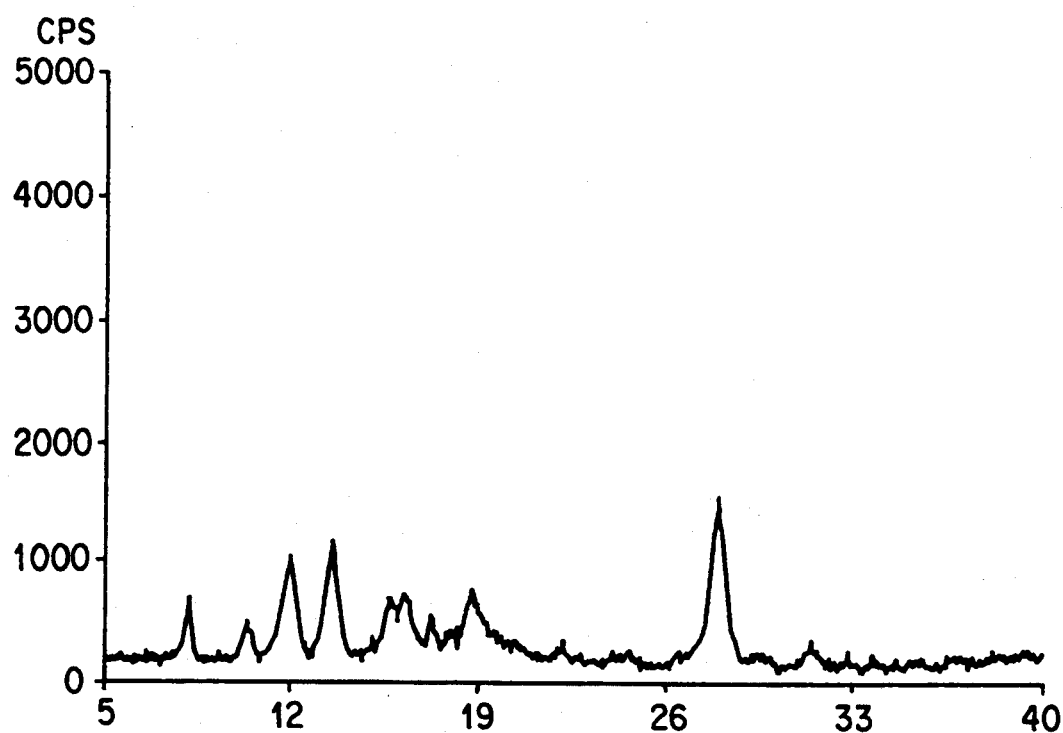
FIGS. 7 and 8 are each a powder X-ray diffraction pattern of the dichlorotin phthalocyanine crystal of I-form obtained in Examples 4 and 5, respectively.
Figure 17:
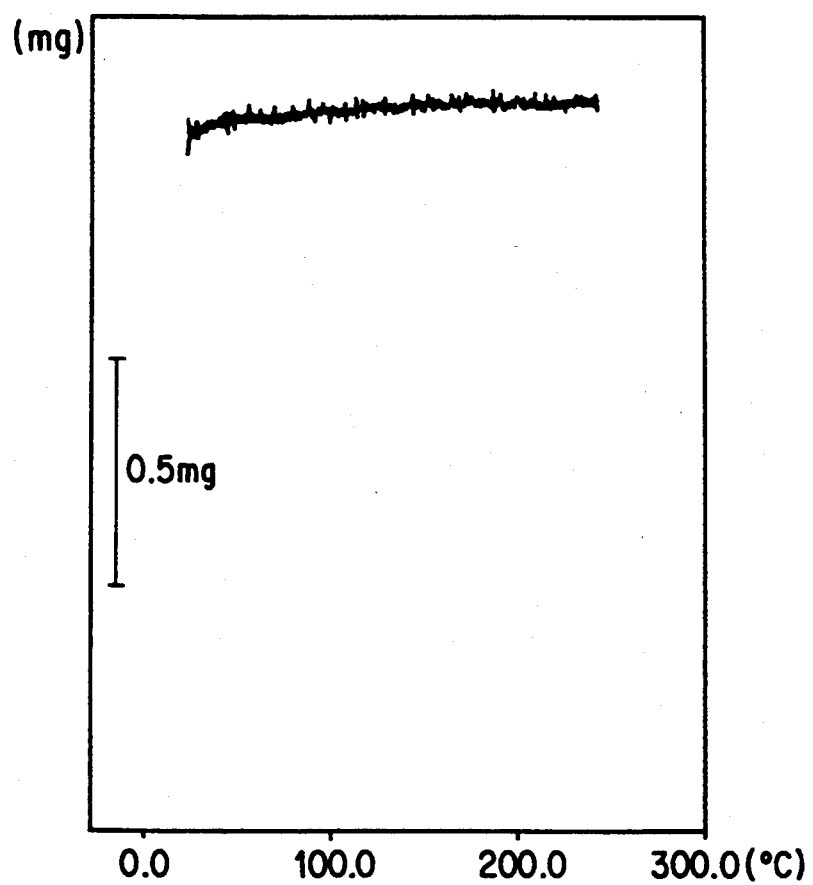

A 0.5 g portion of the dichlorotin phthalocyanine crystal of III-form obtained in Synthesis Example 2 was treated in the same manner as in Synthesis Example 4, except for replacing MCB with n-butyl acetate, to obtain 0.40 g of a dichlorotin phthalocyanine crystal of I-form. An XRD and a thermogram of the resulting dichlorotin phthalocyanine crystal are shown in FIGS. 7 and 17, respectively. The thermogram reveals substantially no weight change at temperatures between 0° and 200° C. (a sample weighing 9.78 mg was analyzed).

EXAMPLE 5

Figure 8:
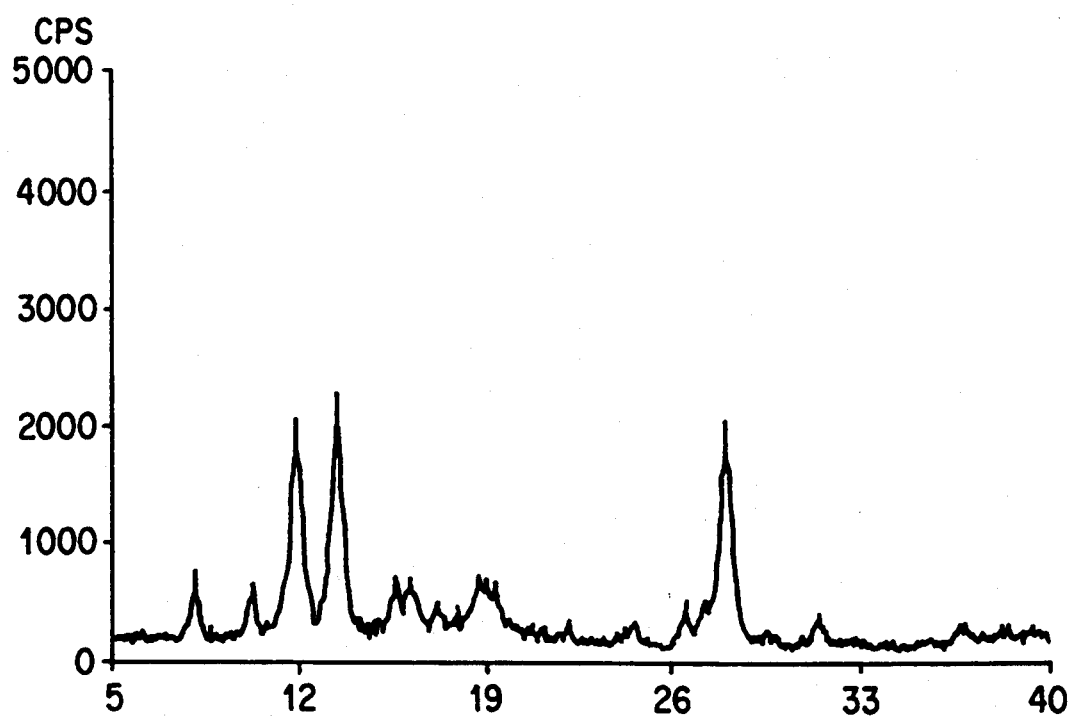

The same procedure of Example 4 was repeated, except for using 0.5 g of the dichlorotin phthalocyanine crystal of IV-form obtained in Synthesis Example 3, to obtain 0.42 g of a dichlorotin phthalocyanine crystal of I-form. An XRD of the resulting crystal is shown in FIG. 8.

EXAMPLE 6

One part of the dichlorotin phthalocyanine crystal obtained in Example 1 was mixed with 1 part of polyvinyl butyral ("Eslec BM-1", produced by Sekisui Chemical Co., Ltd.) and 100 parts of cyclohexanone, and the mixture was dispersed in a paint shaker together with glass beads for 1 hour. The resulting coating composition was coated on an aluminum substrate by dip coating and dried by heating at 100° C. for 5 minutes to form a 0.2 μm thick charge generating layer.

In 20 parts of MCB were dissolved 2 parts of a compound having formula:

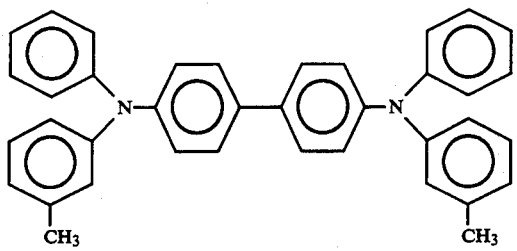

and 3 parts of poly(4,4-cyclohexylidenediphenylenecarbonate) of formula:

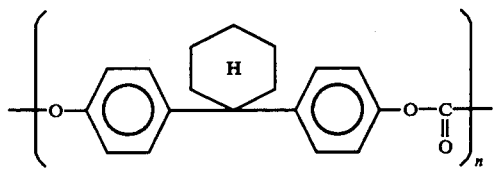

and the resulting coating composition was coated on the charge generating layer by dip coating and dried by heating at 120° C. for 1 hour to form a 20 μm-thick charge transporting layer.

The resulting electrophotographic photoreceptor was charged to −6 kV with a corona discharge in an ambient-temperature and ambient-humidity condition (20° C., 50% RH) by means of an electrostatic paper analyzer ("EPA-8100" manufactured by Kawaguchi Denki K.K.) and then exposed to monochromatic light (800 nm) isolated from light emitted from a tungsten lamp by a monochromator at an irradiance of 1 μW/cm$^2$ at the surface of the photoreceptor. The exposure amount $E_{\frac{1}{2}}$ (erg/cm$^2$) necessary for the surface potential to be reduced to ½ the initial surface potential $V_0$ (V) was measured. Then, the photoreceptor was irradiated with tungsten light of 10 lux for 1 second, and a residual potential $V_R$ was measured. An attenuation ratio DDR (%) from the initial surface potential $V_0$ when the charged photoreceptor was allowed to stand in the dark for one second was also measured. Further, the above-described charging and exposure were repeated 1000 times, and the same measurements of $V_0$, $E_{\frac{1}{2}}$, $V_R$, and DDR were made. The results obtained are shown in Table 1 below.

EXAMPLES 7 AND 8

An electrophotographic photoreceptor was prepared in the same manner as in Example 6, except for using the dichlorotin phthalocyanine crystal obtained in Example 2 or 3. The resulting photoreceptor was evaluated in the same manner as in Example 6, and the results obtained are shown in Table 1.

COMPARATIVE EXAMPLE 1

An electrophotographic photoreceptor was prepared in the same manner as in Example 6, except for using the dichlorotin phthalocyanine crystal as obtained in Synthesis Example 1. The resulting photoreceptor was evaluated in the same manner as in Example 6, and the results obtained are shown in Table 1.

COMPARATIVE EXAMPLE 2

Figure 9:
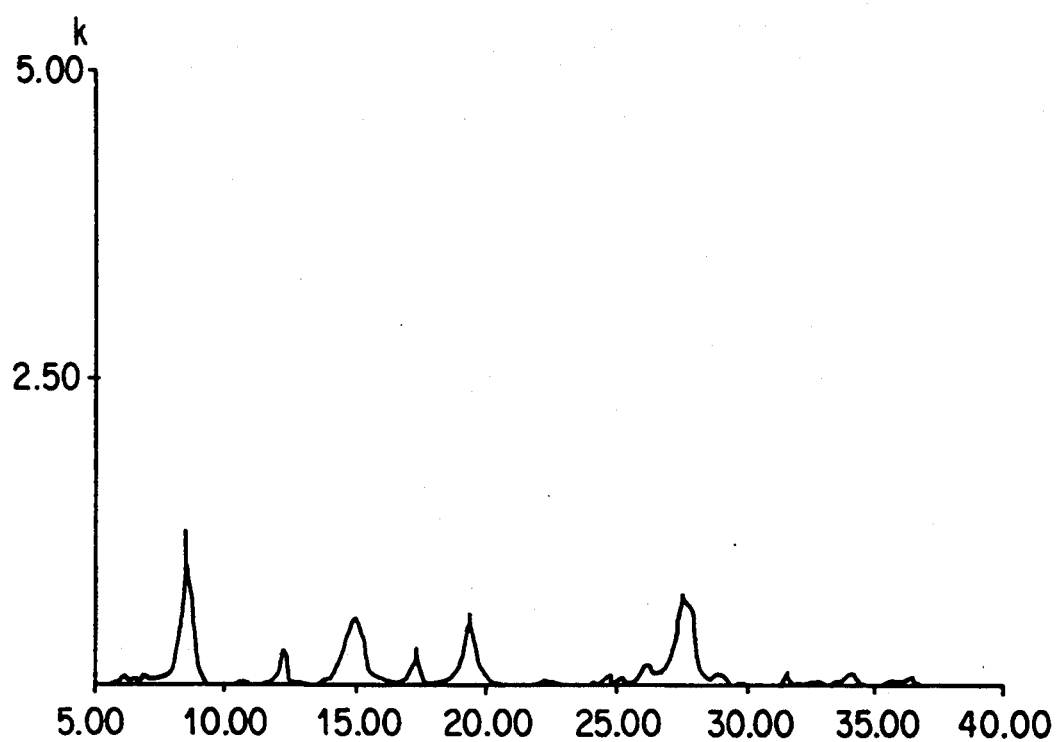
FIG. 9 is a powder X-ray diffraction pattern of the dichlorotin phthalocyanine crystal obtained in Comparative Example 2.

One part of the dichlorotin phthalocyanine crystal obtained in Synthesis Example 1 was slowly added to 30 parts of concentrated sulfuric acid to dissolve at 0° to 5° C. under cooling with ice. The insoluble matter of small amount was removed by filtration, and the filtrate was added dropwise to 500 parts of ice-water while vigorously stirring. The precipitate formed was collected by filtration and washed repeatedly with water until the washing became neutral. The solid was dried under reduced pressure to obtain 0.76 part of a dichlorotin phthalocyanine crystal. An XRD of the resulting crystal is shown in FIG. 9.

An electrophotographic photoreceptor was prepared in the same manner as in Example 6, except for using the thus obtained dichlorotin phthalocyanine crystal. The resulting photoreceptor was evaluated in the same manner as in Example 6, and the results obtained are shown in Table 1.

TABLE 1

| Example No. | XRD of Dichlorotin Phthalocyanine | 1st Operation | | | | 1000th Operation | | | |
|---|---|---|---|---|---|---|---|---|---|
| | | $V_0$ (V) | $E_{\frac{1}{2}}$ (erg/cm$^2$) | DDR (%) | $V_R$ (V) | $V_0$ (V) | $E_{\frac{1}{2}}$ (erg/cm$^2$) | DDR (%) | $V_R$ (V) |
| Example 6 | FIG. 4 | −780 | 3.8 | 3.2 | 5 | −760 | 3.7 | 3.5 | 7 |
| Example 7 | FIG. 5 | −795 | 3.4 | 2.8 | 4 | −770 | 3.4 | 3.0 | 6 |
| Example 8 | FIG. 6 | −830 | 3.2 | 2.7 | 4 | −805 | 3.3 | 3.0 | 5 |
| Compara. Example 1 | FIG. 1 | −870 | 8.5 | 2.0 | 11 | −840 | 8.4 | 2.5 | 14 |
| Compara. Example 2 | FIG. 9 | −690 | 6.1 | 10.7 | 8 | −535 | 6.9 | 16.9 | 15 |

EXAMPLE 9

Figure 10:
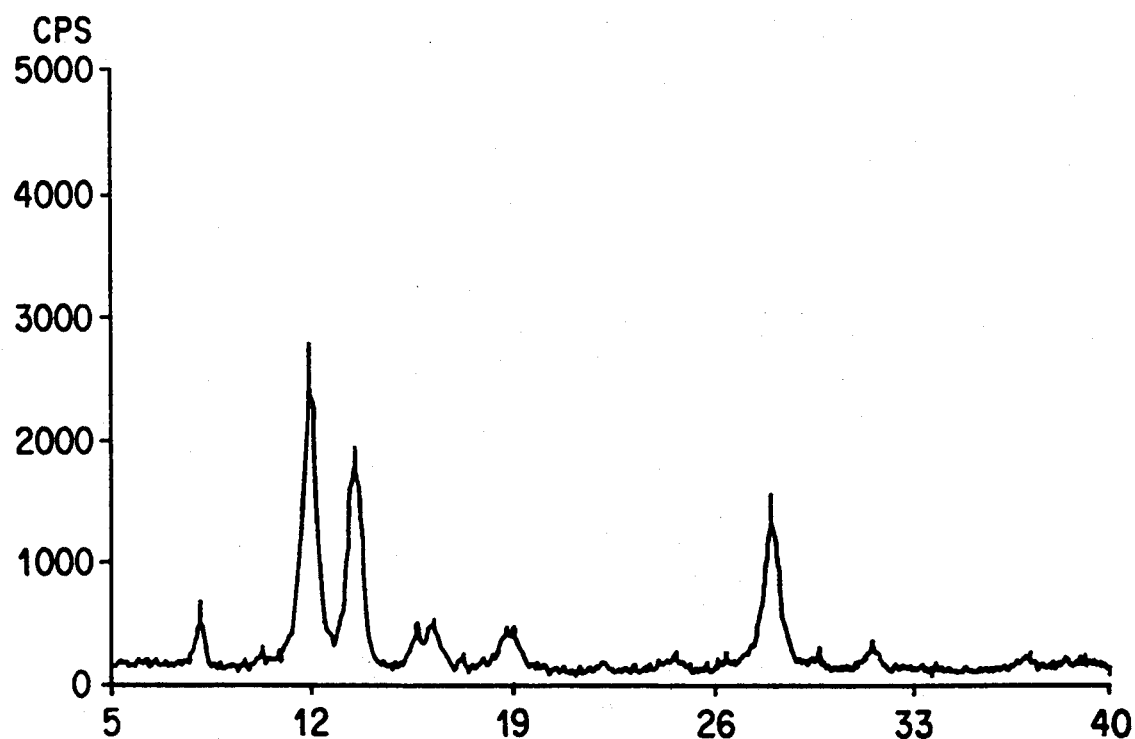
FIGS. 10 and 11 are each a powder X-ray diffraction pattern of the dichlorotin phthalocyanine crystal of I-form obtained in Examples 9 and 10, respectively.

One part of the dichlorotin phthalocyanine crystal obtained in Synthesis Example 2 was mixed with 1 part of polyvinyl butyral (Eslec BM-1) and 100 parts of n-butyl acetate, and the mixture was dispersed in a paint shaker together with glass beads for 1 hour. When the resulting coating composition was dried and subjected to powder X-ray diffractometry, the dichlorotin phthalocyanine crystal was confirmed to be a I-form crystal according to the present invention as shown in FIG. 10. The coating composition was coated on an aluminum substrate by dip coating and dried by heating at 100° C. for 5 minutes to form a 0.2 μm-thick charge generating layer.

A charge transporting layer was then formed thereon in the same manner as in Example 6, and the resulting photoreceptor was evaluated in the same manner as in Example 6. The results obtained are shown in Table 2 below.

EXAMPLE 10

Figure 11:
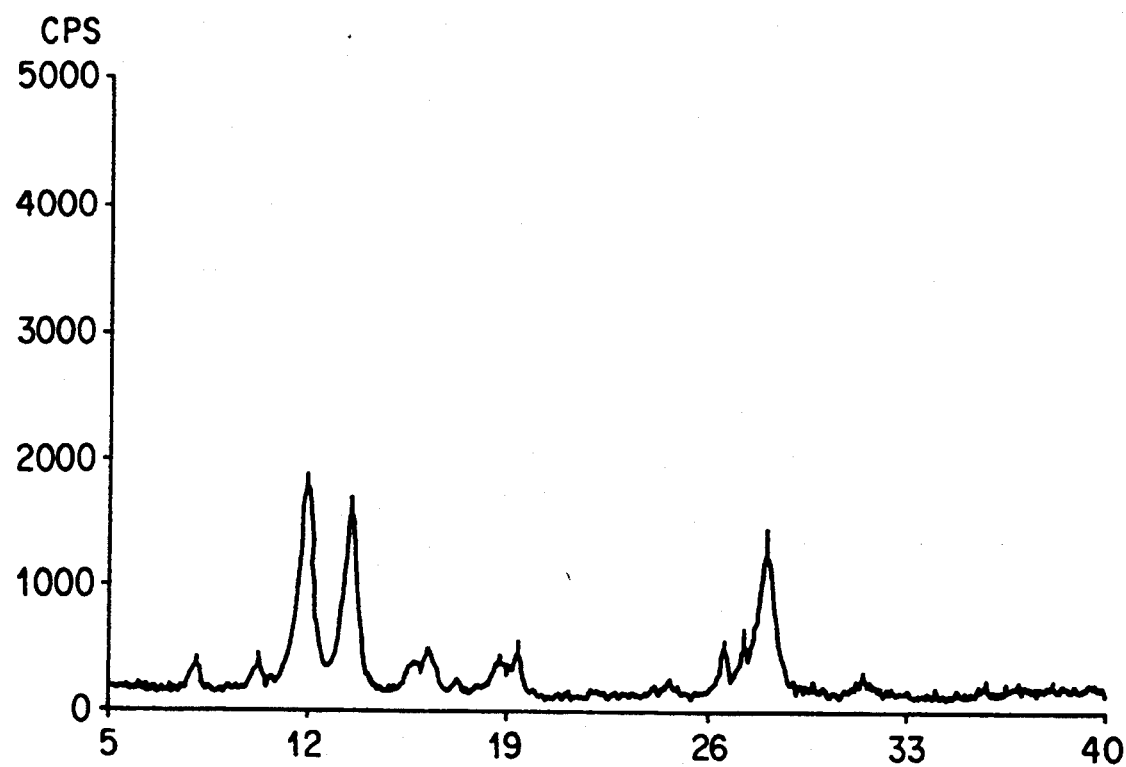

An electrophotographic photoreceptor was prepared in the same manner as in Example 9, except for using the dichlorotin phthalocyanine crystal obtained in Synthesis Example 3. When the coating composition for a charge generating layer was dried and subjected to powder X-ray diffractometry, the dichlorotin phthalocyanine crystal was found to be a I-form crystal according to the present invention as shown in FIG. 11. The resulting photoreceptor was evaluated in the same manner as in Example 6, and the results obtained are shown in Table 2.

COMPARATIVE EXAMPLES 3 TO 4

An electrophotographic photoreceptor was prepared in the same manner as in Example 9, except for replacing n-butyl acetate with n-butanol as a solvent of the coating composition for a charge generating layer and using the pigment (charge generating material) shown in Table 2. The coating composition for a charge generating layer was dried and subjected to powder X-ray diffractometry. The XRD is shown in Table 2. The resulting photoreceptor was evaluated in the same manner as in Example 6, and the results obtained are shown in Table 2.

TABLE 2

Figure 12:
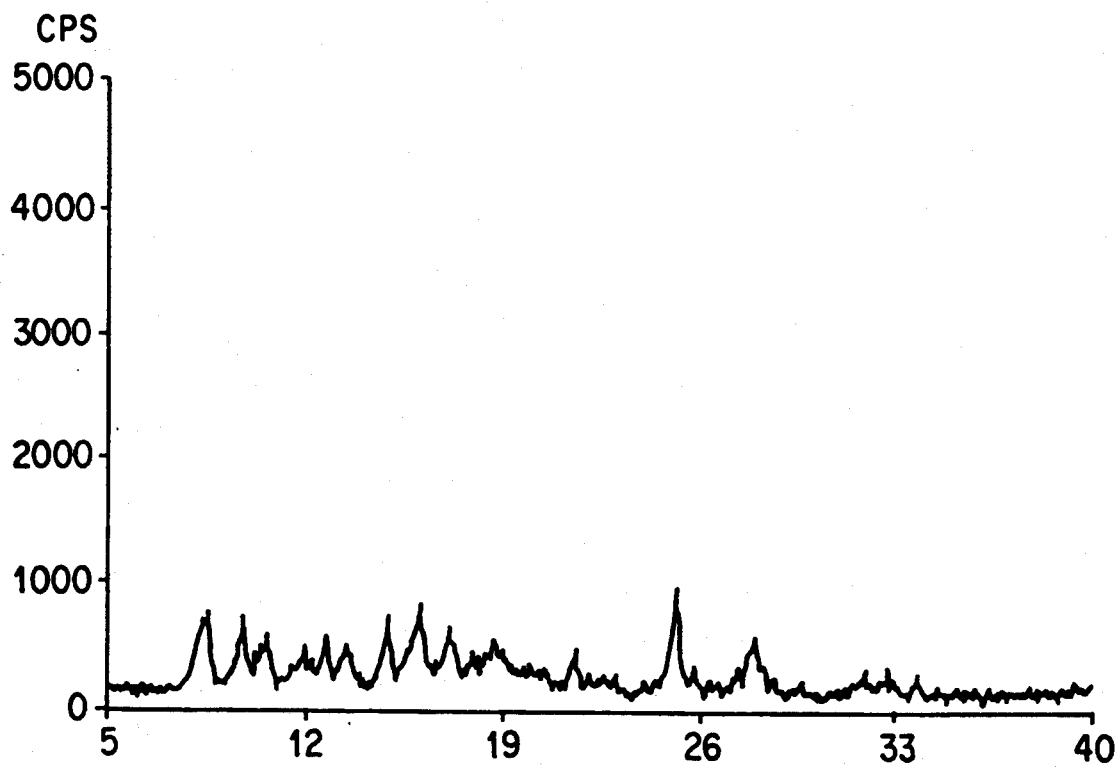
FIGS. 12 and 13 are each a powder X-ray diffraction pattern of the dichlorotin phthalocyanine crystals obtained in Comparative Examples 3 and 4, respectively.
Figure 13:
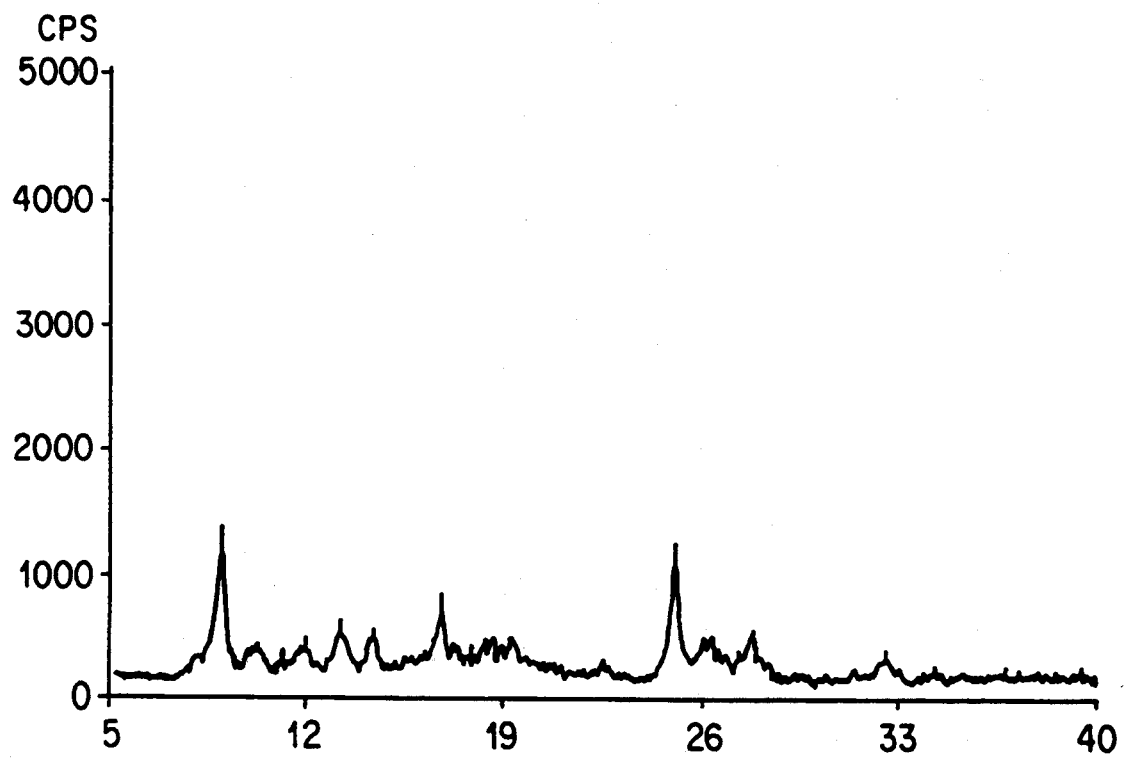
Figure 14:
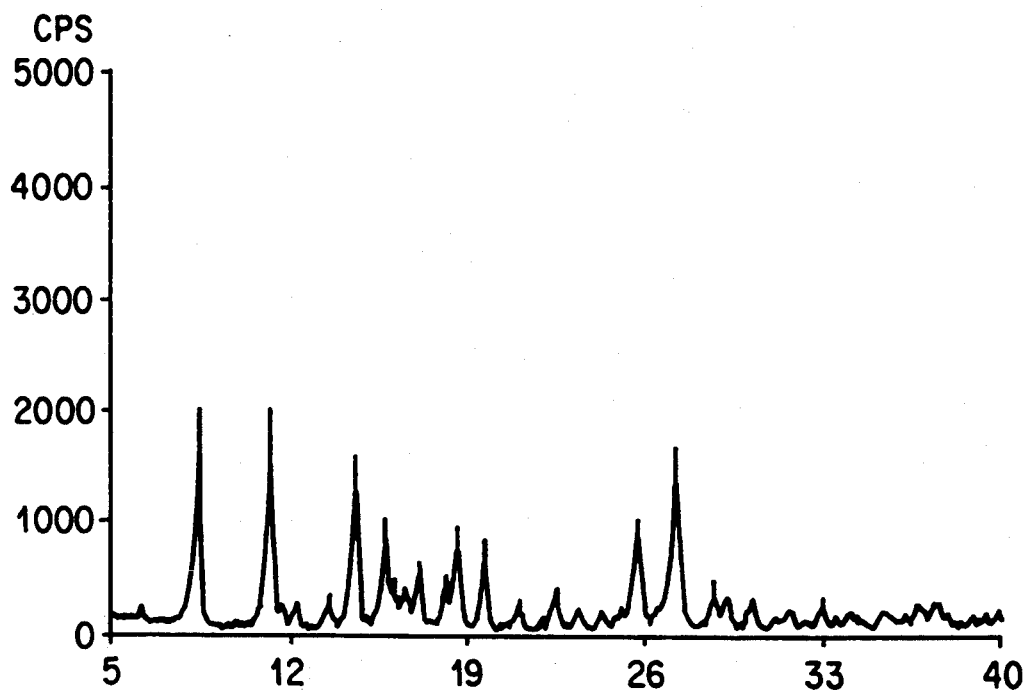
FIG. 14 is a powder X-ray diffraction pattern of a dichlorotin phthalocyanine crystal of II-form.

| Example No. | Pigment | 1st Operation | | | 1000th Operation | | | XRD of Dried CGL Composition |
| --- | --- | --- | --- | --- | --- | --- | --- | --- |
| | | $V_0$ (V) | $E_{178}$ (erg/cm$^2$) | $V_R$ (V) | $V_0$ (V) | $E_{\frac{1}{2}}$ (erg/cm$^2$) | $V_R$ (V) | |
| Example 9 | Synthesis Example 2 | −810 | 2.2 | 4 | −800 | 2.3 | 5 | FIG. 10 |
| Example 10 | Synthesis Example 3 | −820 | 2.3 | 4 | −800 | 2.5 | 5 | FIG. 11 |
| Compara. Example 3 | Synthesis Example 4 | −850 | 2.8 | 5 | −830 | 2.9 | 7 | FIG. 12 |
| Compara. Example 4 | Synthesis Example 5 | −800 | 3.6 | 7 | −780 | 3.5 | 9 | FIG. 13 |

Note: CGL: Charge generating layer.

As described above, the dichlorotin phthalocyanine crystal according to the present invention has a novel crystal form and exhibits photosensitivity in a wavelength region extending to the longer side and is therefore very useful as a photoconductive material of electrophotographic photoreceptors used in, for example, printers utilizing a semi-conductor laser as a light source. The electrophotographic photoreceptor of the present invention using such a dichlorotin phthalocyanine crystal exhibits high sensitivity, low residual potential, and high chargeability, and is less liable to variation of these electrophotographic characteristics on repeated use.

While the invention has been described in detail and with reference to specific examples thereof, it will be apparent to one skilled in the art that various changes and modifications can be made therein without departing from the spirit and scope thereof.

What is claimed is:

1. A process for producing a dichlorotin phthalocyanine crystal having a diffraction pattern against a CuK$_\alpha$ ray in which the highest of the peaks appearing within a Bragg angle ($2\theta+0.2°$) range between 25° and 30° is at 28.2°, comprising treating a dichlorotin phthalocyanine crystal having intense diffraction peaks at Bragg angles ($2\theta\pm0.2°$) of 8.7°, 9.9°, 10.9°, 13.1°, 15.2°, 16.3°, 17.4°, 21.9°, and 25.5° or a dichlorotin phthalocyanine crystal having intense diffraction peaks at Bragg angles ($2\theta+0.2°$) of 9.2°, 12.2°, 13.4°, 14.6°, 17.0°, and 25.3° in an organic solvent.

2. The process as claimed in claim 1, wherein said organic solvent contains a binder resin.

3. The process as claimed in claim 1, wherein said organic solvent is selected from the group consisting of ketones, halogenated hydrocarbons, acetic esters, dimethylformamide, and pyridine.

4. The process as claimed in claim 3, wherein said organic solvent is an acetic ester.

5. A process as claimed in claim 1, wherein said organic solvent comprises a ketone selected from the group consisting of acetone and methylethyl ketone.

6. A process according to claim 1, wherein said organic solvent comprises a halogenated hydrocarbon selected from the group consisting of methylene chloride and chloroform.

7. A process according to claim 1, wherein said organic solvent comprises an acetic ester selected from the group consisting of ethyl acetate and butyl acetate.

8. A process as claimed in claim 1, wherein said organic solvent is dimethylformamide.

9. A process as claimed in claim 1, wherein said organic solvent is pyridine.

10. A process as claimed in claim 1, wherein said treating step comprises dispersing said crystals in the organic solvent at room temperature to 100° C.

11. A process as claimed in claim 1, wherein said treating step comprises dispersing said crystals in the organic solvent with a grinding medium or grinding aid.

12. A process as claimed in claim 1, wherein said treating step comprises dispersing said crystals in the organic solvent at a temperature from 10° to 50° C. and a processing time from 10 minutes to 100 hours.

13. A process as claimed in claim 1, wherein said treating step comprises dispersing said crystals in the organic solvent at a temperature from 10° to 50° C. and a processing time from 1 to 50 hours.

* * * * *